United States Patent [19]

Kawamura et al.

[11] 4,145,129

[45] Mar. 20, 1979

[54] PHOTOGRAPHIC INFORMATION DISPLAY APPARATUS FOR CAMERA

[75] Inventors: Masaharu Kawamura, Kawasaki; Nobuaki Sakurada, Yokohama; Nobuhiko Shinoda; Hiroyasu Murakami, both of Tokyo; Tadashi Ito, Yokohama, all of Japan

[73] Assignee: Canon Kabushiki Kaisha, Tokyo, Japan

[21] Appl. No.: 878,598

[22] Filed: Feb. 16, 1978

[30] Foreign Application Priority Data

Feb. 28, 1977 [JP] Japan ................... 52-21063

[51] Int. Cl.² .............. G03B 7/08; G03B 17/18; H05B 41/14
[52] U.S. Cl. ................. 354/23 D; 340/706; 340/762; 340/802; 340/803; 354/60 L; 354/289
[58] Field of Search ............ 340/336, 324 R; 58/50 R; 354/23 R, 53, 60 L, 289

[56] References Cited

U.S. PATENT DOCUMENTS

| | | |
|---|---|---|
| 3,982,254 | 9/1976 | Ito et al. ............ 354/23 D X |
| 4,032,933 | 6/1977 | Ito et al. ............ 354/23 D |

FOREIGN PATENT DOCUMENTS 2651002  5/1977  Fed. Rep. of Germany ........ 354/23 D Primary Examiner—Michael L. Gellner
Attorney, Agent, or Firm—Toren, McGeady and Stanger

[57] ABSTRACT

A photographic information display apparatus for a camera provided with at least three display chips. The second chip has a number of segments less than the first chip while the segments of the third display chip are connected to a driving signal transfer line of an encoder which is not connected to the segments of the second chip. This arrangement dispenses with another driving signal transfer line for the third display chip.

10 Claims, 1 Drawing Figure

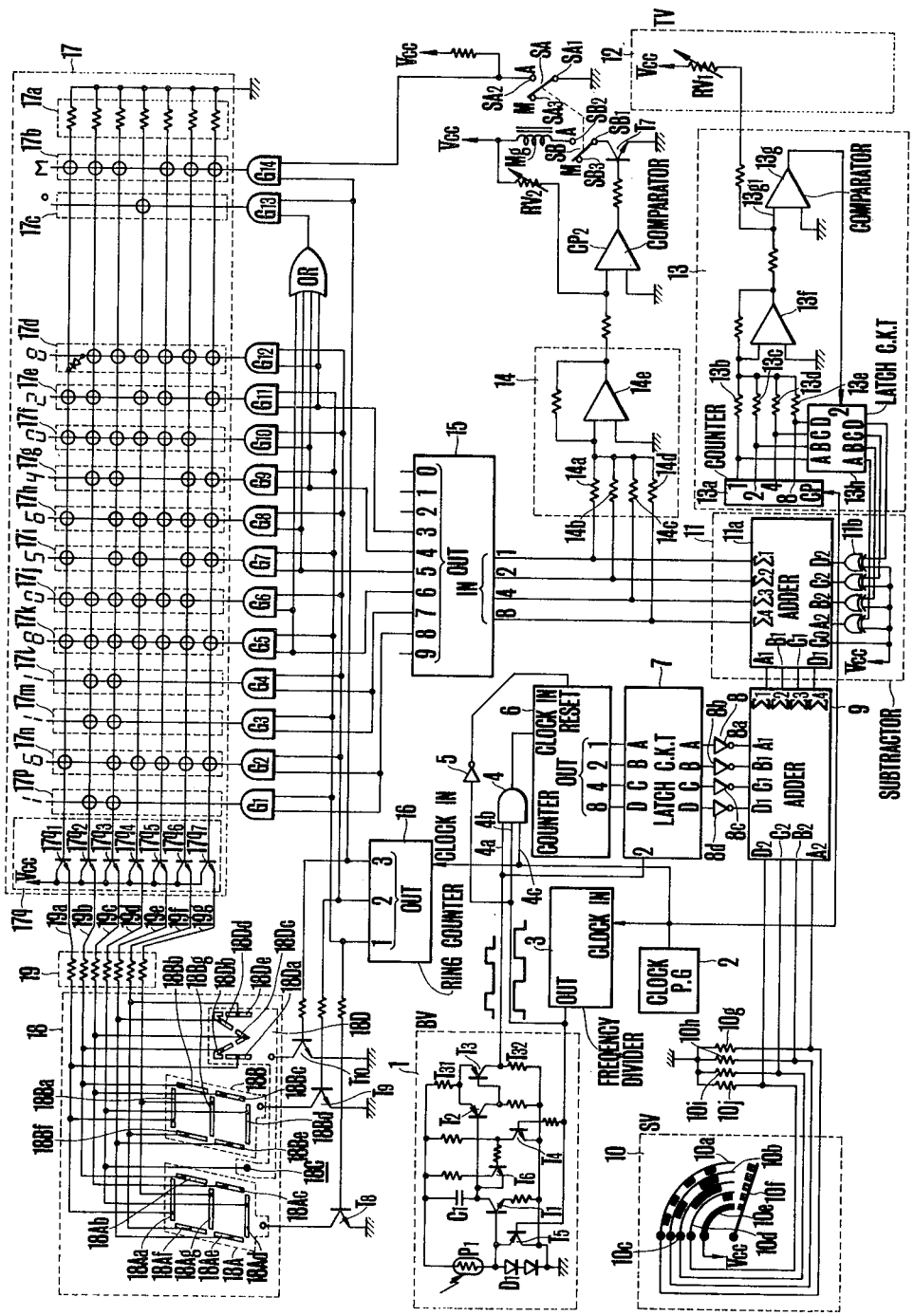

PHOTOGRAPHIC INFORMATION DISPLAY APPARATUS FOR CAMERA

BACKGROUND OF THE INVENTION

1. Field of the Invention

This invention relates to a photographic information display apparatus for a camera and more particularly to an improvement on such an apparatus which digitally displays diaphragm aperture information inside a view finder of the camera.

2. Description of the Prior Art

With the advancement of electronic technology in recent years, there have been proposed many digital control methods in the field of exposure control devices for cameras. In such a camera in general, photographic information is also arranged to be digitally displayed. On the other hand, even for a camera of the type analogically controlling an exposure value, it is also advantageous to perform display digitally instead of performing it analogically. Analogical exposure control type camera that digitally perform display, therefore, have been increasing in number. Compared with an analog display with a meter or the like, the digital display excels in terms of resistance to vibration and shocks and makes clear display by emission of light irrespective of ambient conditions such as the brightness of an object to be photographed. In addition to such advantages, a digital display method permits reduction in size of a display apparatus because of easy adoption of integrated circuits and also permits making display much more precisely. In view of such advantages, digital display methods have come to be employed in a greater number of cameras.

Although digital display methods have many advantages as mentioned in the foregoing, there is a problem in actual employment of such methods. For example, in the case of display chips with a decimal point, a total of eight driving signal transfer lines are required for seven segments, for example, including seven lines for driving seven segment and one for driving the decimal point. With such a number of lines required, it is difficult to dispose a digital display apparatus in the vicinity of a view finder of a camera wherein there is available only a meager space.

SUMMARY OF THE PRESENT INVENTION

It is an object of this invention to provide a compact display apparatus. It is another object of this invention to provide a display apparatus which requires a less number of lines for display chips thereof.

It is a further object of this invention to provide a display system which is suitable for a camera of a shutter priority system.

These and other objects and advantages of this invention will become apparent from the following description taken in connection with the accompanying drawing.

DESCRIPTION OF THE PREFERRED EMBODIMENTS

The accompanying drawing is a circuit diagram showing a camera to which the display apparatus of this invention is applied as an embodiment example. Referring to the drawing, a reference numeral 1 indicates a light measuring circuit consisting of elements P1, D1, T1-T6 and C1. The symbol P1 indicates a light sensitive element which produces an electrical signal corresponding to the brightness of an object to be photographed; D1 indicates a diode connected in series with the element P1 to logarithmically suppress a photoelectric current flowing through the light sensitive element P1; T5 indicates a pnp transistor connected in parallel with the diode D1; T1 is a npn transistor provided with a base electrode which is connected to the anode of the diode D1; C1 indicates a capacitor connected to the ground through a collector — emitter path of the transistor T1; T2 is a pnp transistor provided with a base electrode which is connected to the collector electrode of the transistor T1; and T3 indicates a pnp transistor provided with an emitter electrode which is connected through a resistor T31 to an unillustrated power source (hereinafter will be called Vcc for short), with a base electrode which is connected to the collector electrode of the transistor T2 and with a collector electrode which is connected to the ground through a resistor T32. A reference numeral 2 indicates a clock pulse generator which generates pulses at a given frequency; and 3 indicates a frequency divider provided with an input terminal CLOCK IN connected to the output terminal of the clock pulse generator and an output terminal OUT connected to the base electrode of the transistor T5. For example, a product called SN 7493 of Texas Instruments Ltd. (hereinafter will be called TI for short) may be employed as the frequency divider 3. A numeral 4 indicates an AND circuit having a first input terminal connected to the collector electrode of the transistor T3, a second input terminal connected to the output terminal of the frequency divider 3 and a third input terminal connected to the output terminal of the clock pulse generator 2; 5 indicates an inverter connected to the output terminal of the frequency divider 3; and 6 indicates a binary counter having an input terminal CLOCK IN connected to the output terminal of the AND circuit 4, four output terminals 1, 2, 4 and 8 and a reset signal input terminal RESET connected to the output terminal of the inverter 5. For example SN 7493 of TI may be employed as the binary counter 6. A numeral 7 indicates a latch circuit which is composed of a shift register of 4 bits of a parallel in — parallel out type and is provided with a clock signal input terminal 2 connected to the transistor T3 of the light measuring circuit, input terminals A, B, C and D connected to the corresponding output terminals 1, 2, 4 and 8 of the counter 6 and output terminals A, B, C and D. A numeral 8 indicates an inverter circuitry having four inverters including an inverter 8a which is connected to a least significant bit A of the latch circuit 7, an inverter 8b which is connected to a bit B, an inverter 8c which is connected to a bit C and another inverter 8d which is connected to a most significant bit D. A numeral 10 indicates a film speed setting mechanism provided for setting a film speed and has conductive code plates 10a-10d which are provided with patterns as shown in the drawing, a common electrode 10e which is connected to Vcc and a brush 10f which comes into contact with any of the patterns of the code plates. The code plate 10a is connected to a resistor 10g; the code plate 10b to a resistor 10h; the code plate 10c to a resistor 10i; and the code plate 10d to a resistor 10j. One terminal of each of these resistors 10g-10j is connected to the ground. A numeral 9 indicates a 4-bit binary full adder which is formed, for example, with a product SN7483 of TI or the like and which is provided with input terminals A1-D1 connected to corresponding inverters of the inverter circuitry 8, input terminals A2-D2 connected to said resistors 10g–10j and output terminals Σ1–Σ4. A numeral 11 indicates a 4-bit binary subtractor consisting of a 4-bit binary adder 11a which is of the same construction as the adder 9 and four exclusive OR circuits 11b. A numeral 12 indicates a shutter speed setting part provided with a variable resistor RV1 which is interlocked with an unillustrated shutter dial. A numeral 13 indicates an analog-to-digital converter which converts an analogical shutter speed signal set at the resistor RV1 into a binary number. The analog-to-digital converter is composed of a 4-bit binary counter 13a which is provided with an input terminal CP connected to the output terminal of the clock pulse generator 2 and with output terminals 1, 2, 4 and 8 and which is of the same construction as the counter 6, a group of resistors 13b–13e which constitute a digital-to-analog converter, an operational amplifier 13f, a comparator 13g and a latch circuit 13h which is of the same construction as the latch circuit 7. A numeral 14 indicates a digital-to-analog converter comprising a group of resistors 14a–14d connected to the corresponding output terminals of the adder 11a of the subtractor 11 and an operational amplifier 14e. A reference symbol CP2 indicates a comparator having an input terminal connected to the output terminal of the digital-to-analog converter 14 and another input terminal which is connected to the ground. A symbol RV2 indicates a variable resistor which is interlocked with an unillustrated diaphragm mechanism and one end of which is connected to the power source Vcc while the other end is connected to one of the input terminals of the comparator CP2. A symbol T7 indicates npn transistor having a base electrode connected to the output terminal of the comparator, a collector electrode connected to Vcc through a magnet Mg and an emitter electrode connected to the ground; and 15 indicates a decoder having input terminals 1, 2, 4 and 8 connected to the corresponding output terminals of the subtractor 11 and output terminals 0–9. The output terminal 3 becomes a high level (hereinafter will be called "1") when the content of the subtractor 11 represents an aperture value F = 2.8; the output terminal 4 becomes "1" when the content of the subtractor 11 represents an aperture value F = 4.0; the output terminal 5 becomes "1" when the content of the subtractor 11 represents an aperture value of F = 5.6; the output terminal 6 becomes "1" when the content of the subtractor 11 represents F = 8; the output terminal 7 becomes "1" when the content of the subtractor 11 represents F = 11; and the output terminal 8 becomes "1" when the content of the subtractor 11 represents F = 16. A numeral 16 indicates a ring counter which has an input terminal LOCK IN connected to the output terminal of the clock pulse generator 2 and which has output terminals 1, 2 and 3. A numeral 17 indicates an encoder which encodes the output signal of the decoder 15 and comprises a resistor group 17a one end of which is grounded, a part 17b for encoding a character M, a part 17c for encoding a decimal point, a part 17d for encoding a numeric 8, a part 17e for encoding a numeric 2, a part 17f for encoding a numeric 0, a part 17g for encoding a numeric 4, a part 17h for encoding a numeric 6, a part 17i for encoding a numeric 5, a part 17j for encoding a numeric 0, a part 17k for encoding a numeric 8, a part 17l for encoding a numeric 1, a part 17m for encoding a numeric 1, a part 17n for encoding a numeric 6, a part 17p for encoding a numeric 1 and a transistor group consisting of a plurality of npn transistors the collector electrodes of which are connected to the power source Vcc through a common line. In each line of the encoder 17, the parts indicated by circles represent parts where transverse lines and longitudinal lines are connected to each other by diodes as shown at part 17d. Symbols G1–G14 indicate a plurality of AND circuits which constitute a control gate for controlling energization of the parts 17b–17p of the encoder 17. The first output terminal 1 of the ring counter 16 is connected to one input terminal of each of the circuits G1, G3, G5, G7, G9 and G11 which form the control gate. The second output terminal 2 of the ring counter 16 is connected to one input terminal of each of the circuits G2, G4, G6, G8, G10 and G12 which also form the control gate. The third output terminal 3 of the ring counter 16 is connected to one input terminal of each of the circuits G13 and G14 which also form the control gate. A reference symbol OR indicates an OR circuit having an input terminal connected to the output terminal 6 of the decoder 15, another input terminal connected to the output terminal 5 of the decoder 15, an output terminal connected to the output terminal 4 of the decoder 15 and four input terminals connected to the output terminal 3 of the decoder 15. A reference numeral 18 indicates a display device for displaying photographic information corresponding to the output signal of the encoder 17. The display device 18 comprises display chips 18A, 18B and 18C for displaying an aperture value and a display chip 18D for displaying a photographing mode. The display chip 18A is a numeric display chip having seven segments including a segment 18Aa connected to a driving transistor $17g_1$ of the encoder 17 through a first driving signal transfer line 19a, a segment 18Ab connected to a driving transistor $17g_2$ of the encoder 17 through a second signal transfer line 19b, a segment 18Ac connected to a driving transistor $17g_3$ of the encoder 17 through a third driving signal transfer line 19c, a segment 18Ad connected to the driving transistor $17g_4$ of the encoder 17 through a fourth driving signal transfer line 19d, a segment 18Ae connected to a driving transistor $17g_5$ of the encoder 17 through a fifth driving signal transfer line 19e, a segment 18Af connected to a driving transistor $17g_6$ of the encoder 17 through a sixth driving signal transfer line 19f, a segment 18Ag connected to a driving transistor $17g_7$ of the encoder 17 through a seventh driving signal transfer line 19g and an unillustrated common electrode which is connected to the ground through a transistor T8. The display chip 18B is a numeric display chip which also has seven segments including a segment 18Ba connected to the first driving signal transfer line 19a, a segment 18Bb connected to the second driving signal transfer line 19b, a segment 18Bc connected to the third driving signal transfer line 19c, a segment 18Bd connected to the fourth driving signal transfer line 19d, a segment 18Be connected to the fifth driving signal transfer line 19e, a segment 18Bf connected to the sixth driving signal transfer line 19f, a segment 18Bg connected to the seventh driving signal transfer line 19g and a common electrode which is connected to the ground through a transistor T9. The display chip 18C is composed of one circular segment for displaying a decimal point. This segment is connected to the fourth driving signal transfer line 19d to which the segments 18Da–18De of the display chip D are not connected. The display chip 18D consists of segments arranged to display "M" which represents a manual photographing mode. The display chip 18D is an alphabetical display chip having a total of five segments which are fewer than the segments included in the numeric display chips 18A and 18B. The chip 18D thus consists of a segment 18Da connected to the first driving signal transfer line 19a, a segment 18Db connected to the second driving signal transfer line 19b, a segment 18Dc connected to the third driving signal transfer line 19c, a segment 18Dd connected to the fifth driving signal transfer line 19e and a common electrode connected to the ground through a transistor T10. A reference symbol indicates a selection switch provided for selection of a photographing mode. The switch SA comprises a movable contact SA1 connected to the ground, a stationary contact SA2 connected to the input terminal of the AND circuit G14 and to the power source Vcc and another stationary contact SA3. A symbol SB indicates another photographing mode selection switch comprising a movable contact SB1 connected to the collector electrode of the transistor T7, a stationary contact SB2 connected to the magnet Mg and another stationary contact SB3. The switches SA and SB are interlocked with each other as shown in the drawing.

The operation of the camera which is arranged as described in the foregoing will be described below. However, since the present invention relates to the display apparatus used for the camera, exposure control will be briefly described.

With the movable contacts SA1 and SB1 of the switches SA and SB respectively connected to the stationary contacts SA2 and SB2, the operation of the camera is made as follows when a shutter priority automatic exposure mode is selected: Each circuit of the camera is supplied with an electric power from the power source Vcc when an unillustrated shutter release button is depressed. The clock pulse generator 2 begins to oscillate. As a result of this, an output signal of the frequency divider 3 turns off the transistor T5. Then, a voltage corresponding to the quantity of light coming from an object to be photographed is impressed on the base electrode of the transistor T1 to charge the capacitor C1 with electricity to a degree corresponding to the brightness of the object. Since the input terminals 4a and 4b of the AND circuit 4 becomes "1" when the output signal of the frequency divider 3 becomes "1", the pulses produced by the pulse generator 2 are impressed on the counter 6 through the AND circuit 4 concurrently with the commencement of light measurement. The counter 6 counts the pulses. When a length of time corresponding to the brightness has passed, the transistor T2 is turned on and the transistor T3 turned off. This causes the input terminal 4a of the AND circuit 4 to have a low level (hereinafter will be called "0") to close the AND circuit 4 immediately. Therefore, the counter 6 counts a number of pulses which corresponds to the brightness of the object to be photographed and which have passed through the AND circuit 4 while the circuit 4 remains open. Further, with the transistor T3 turned off, the latch circuit 7 latches the content of the counter 6 in synchronism with the trailing edges of the pulses generated at both ends of the resistor T32. This causes brightness information which has been converted into a digital signal of a binary number to appear at the output terminal of the latch circuit 7. An output signal of the latch circuit 7 is added together with film speed information set at the film speed setting mechanism 10 and then is applied as an EV value to the adder 11a which constitutes the subtractor 11. On the other hand, the shutter speed value which is set at the resistor RV1 is compared by the comparator 13g with an analog signal corresponding to a digital signal produced by the counter 13a. When the comparator 13g becomes "0", the content of the counter 13a is latched by the latch circuit 13h. Therefore, the shutter speed value is latched at the latch circuit 13h as a digital signal of a binary number. The digital signal corresponding to the preset shutter speed is applied to the adder 11a through a complement circuit 11h. This causes a digital signal of a binary number corresponding to an appropriate aperture value Av to appear at the output terminals Σ1-Σ4 of the subtractor 11. This digital signal of the binary number is decoded by the decoder 15. Assuming that the output signal of the subtractor 11 corresponds to an aperture value of F = 2.8; the output terminal 3 of the decoder 15 becomes "1". Then, since the AND circuit G11 is opened when the output terminal 1 of the ring counter 16 becomes "1", the part 17e of the encoder 17 is energized to cause an electric current to flow to the segments 18As, 18Ab, 18Ag, 18Ae and 18Ad through the part 17g of the encoder 17 and the driving signal transfer device 19 and the display chip 18A comes to display a numeric "2". Then, when the output terminal 2 of the ring counter 16 becomes "1", the AND circuit G12 is opened in place of the AND circuit G11 to energize the part 17d of the encoder 17. As a result of this, an electric current flows through the part 17g of the encoder 17 and the driving signal transfer device 19 to the segments 18Ba, 18Bb, 18Bc, 18Bd, 18Be, 18Bf and 18Bg of the display chip 18B. This causes the display chip 18B to display a numeric "8". Further, when the output terminal 3 of the ring counter 16 becomes "1", the AND circuit G13 is opened as "1" is impressed on the input terminal of the circuit G13. As a result of this, the part 17c of the encoder 17 is energized by the output signal of the AND circuit G13 and an electric current flows to the display chip 18C to cause it to display a decimal point. At this moment, one of the input terminal of the AND circuit G14 is grounded through the switch SA. Therefore, the output of the AND circuit G14 is "0". Accordingly, the part 17b of the encoder 17 is not energized and the display chip 18D does not emit light. Therefore, when the output terminal 3 of the decoder 15 becomes "1", the display device 18 comes to display "2.8". In the same manner, the display device 18 displays "4.0" when the output terminal 4 of the decoder 15 is "1"; displays "5.6" when the output terminal 5 of the decoder 15 is "1"; displays "8.0" when the output terminal 6 of the decoder 15 is "1"; displays "11" when the output terminal 8 of the decoder 15 is "1"; and displays "16" when the output terminal 8 of the decoder is "1".

With the shutter release button further depressed, an unillustrated known diaphragm mechanism comes to act to stop down a diaphragm aperture. When the action to stop down the aperture commences, the resistance value of the resistor RV2 which is interlocked with the diaphragm mechanism comes to vary with the value of the aperture being stopped down. Then, when the aperture value of an unillustrated photograph taking lens comes to coincide with the content of the subtractor 11 which represents a result of calculation, the comparator CP2 assumes a low level; the transistor T7 is turned off; and the magnet Mg is no longer excited. With the magnet not excited, an unillustrated member which is controlled by the magnet Mg comes to define the stopping down action to adjust the aperture of the photograph taking lens to a suitable value. Then, an unillustrated shutter opens for a preset period of time to give an appropriate degree of exposure.

Assuming that shutter speed and the aperture value has been manually set beforehand, when a manual mode is selected with the positions of the switches SA and SB shifted from their movable contacts SA1 and SB1 to their stationary contacts SA3 and SB3, one of the input terminals of the AND circuit G14 is connected to the powder source Vcc through a resistor. Then, when the shutter release button is depressed, a digital signal of a binary number is produced at the output terminal of the subtractor 11 representing an appropriate aperture value according to the brightness of the object, shutter speed and film speed in the same manner as in the case of the shutter priority automatic exposure mode. In this case, if the content of the subtractor 11 is representing the aperture value of F = 2.8, the display device 18 displays "2.8" in response to the output signal of the ring counter 16 as mentioned in the foregoing. Further, when the output terminal 3 of the ring counter 16 becomes "1" in this case, the AND circuit G14 also opens to energize the part 17b of the encoder 17. Accordingly, with the manual mode selected, all segments 18Da–18De of the display chip 18D are energized to cause the display device 18 to display "2.8M". The aperture of the photograph taking lens is set at an aperture value which has been manually preset and the shutter is opened for a length of time corresponding to the shutter speed which has been preset at the resistor RV1 in the same manner as described in the foregoing. However, since exposure control does not directly relates to the present invention, the description of it is omitted herein. Further, in the case of the manual mode, the display device 18 displays an appropriate aperture value determined in accordance with a result of calculation instead of a preset aperture value. This might appear to be inconvenient. However, this system permits a photographer to judge whether the preset aperture value is an appropriate value for exposure and thus can be considered more convenient than the conventional system of displaying a preset aperture value.

As described in the foregoing, in accordance with this invention, the segments of the third display chip 18C is connected to the driving signal transfer line 19d to which the segments of the second display chip 18D which has a less number of segments than the first display chip 18A or 18B are not connected. This arrangement permits reduction in the number of driving signal transfer lines required.

For example, in accordance with the conventional arrangement, if a commercially available display chip which is provided with a decimal point is employed as display chip 18A which displays the exposure parameter, a total of eight driving signal transfer lines are required for the driving signal transfer device 19. Whereas, in accordance with this invention, the required number of driving signal transfer lines is reduced to seven, because the segment of the decimal point is driven by utilizing the driving signal transfer line 19d to which the segments of the display chip 18D provided for displaying the photographing mode are not connected. Therefore, the display device of the present invention can be arranged in a limited space available at a view finder or the like inside a camera.

Further, if the size of the display chip 18D which is provided for displaying the photographing mode is arranged to be about the same as the display chip 18A or 18B, the brightness of each of the display chips 18A or 18B and 18D can be approximately equalized for improvement in the visibility of the display made by the display device 18.

What is claimed is:

1. A photographic information display apparatus for a camera, comprising:
   (a) an encoder for encoding a plurality of photographic informations;
   (b) a plurality of driving signal transfer lines for transferring an output signal from said encoder;
   (c) at least one first display chip having a plurality of segments connected to said driving signal transfer lines for displaying the photographic informations;
   (d) a second display chip having at least one segment connected to at least one of said driving signal transfer lines for displaying said photographic informations encoded by the encoder, the second display chip being provided with a number of segments less than the segments of the first display chip; and
   (e) a third display chip connected to at least one of the driving signal transfer lines, to which the segments of the second display chip are not connected, for displaying the photographic informations encoded by said encoder.

2. A photographic information display apparatus according to claim 1, wherein said first display chip includes seven segments.

3. A photographic information display apparatus according to claim 1, wherein said second display chip includes five segments.

4. A photographic information display apparatus according to claim 1, wherein said driving signal transfer lines include seven driving signal transfer lines.

5. A photographic information display apparatus according to claim 1, wherein said third display chip includes one segment.

6. A photographic information display apparatus according to claim 1, wherein said third display chip has a circular segment arranged in the vicinity of said first display chip to display a decimal point.

7. A photographic information display apparatus for a camera of a shutter priority system, comprising:
   (a) a decoder which decodes aperture values of binary numbers into decimal numbers;
   (b) setting means for setting a photographing mode;
   (c) an encoder connected to the output terminal of said decoder and to the setting means for encoding the photographing mode and said decimal number;
   (d) a plurality of driving signal transfer lines for transferring an output signal from said encoder;
   (e) two display chips connected to said driving signal lines for displaying the aperture values, each of the display chips including a plurality of segments;
   (f) a second display chip having at least one segment connected to at least one of said driving signal transfer lines for displaying said photographing mode encoded by the encoder, the second display chip being provided with a number of segments less than the segments included in each of said display chips; and
   (g) a third display chip connected to at least one of the driving signal transfer lines, to which the segments of the second display chip are not connected, for displaying said aperture value encoded by said encoder.

8. A photographic information display apparatus according to claim 7, wherein each of said two display chips has seven segments.

9. A photographic information display apparatus according to claim 7, wherein said second display chip has five segments arranged to display an alphabetical letter "M".

10. A photographic information display apparatus according to claim 9, wherein said third display chip consists of one segment disposed between said two display chips to display a decimal point there.

* * * * *